(12) United States Patent
Prance

(10) Patent No.: US 9,576,776 B2
(45) Date of Patent: Feb. 21, 2017

(54) APPARATUS FOR SENSING IONIC CURRENT

(71) Applicant: University of Sussex, Brighton, Sussex (GB)

(72) Inventor: Robert Prance, Brighton (GB)

(73) Assignee: University of Sussex, Brighton, Sussex (GB)

(*) Notice: Subject to any disclaimer, the term of this patent is extended or adjusted under 35 U.S.C. 154(b) by 0 days.

(21) Appl. No.: 14/439,645

(22) PCT Filed: Oct. 30, 2013

(86) PCT No.: PCT/GB2013/052823
§ 371 (c)(1),
(2) Date: Apr. 29, 2015

(87) PCT Pub. No.: WO2014/068304
PCT Pub. Date: May 8, 2014

(65) Prior Publication Data
US 2015/0279642 A1 Oct. 1, 2015

(30) Foreign Application Priority Data
Oct. 30, 2012 (GB) .................................. 1219488.2

(51) Int. Cl.
*G01T 1/18* (2006.01)
*G01T 1/17* (2006.01)
(Continued)

(52) U.S. Cl.
CPC ........... *H01J 49/0027* (2013.01); *G01T 1/185* (2013.01); *H01J 49/26* (2013.01)

(58) Field of Classification Search
CPC ........ H01L 25/042; H01L 31/09; G01T 1/185; G01T 1/16; G01T 1/17; G01T 1/18; G01T 3/008; G01J 5/20; G01J 5/24
(Continued)

(56) References Cited

U.S. PATENT DOCUMENTS 3,908,957 A 9/1975 Schutt
4,167,687 A 9/1979 Furney
(Continued)

FOREIGN PATENT DOCUMENTS

CN 201488977 U 5/2010
DE 2054717 A1 5/1972
(Continued)

OTHER PUBLICATIONS

Aydin, A., et al., "A High Sensitivity Calibrated Electric Field Meter Based on the Electric Potential Sensor," Measurement Science and Technology, IOP, Bristol, GB, Nov. 4, 2010, vol. 21, No. 12, p. 125901.

(Continued)

*Primary Examiner* — David A Vanore
(74) *Attorney, Agent, or Firm* — Schwabe, Williamson & Wyatt, P.C.

(57) ABSTRACT

The invention provides a charged particle sensor (10) for detecting and measuring ionic current generated by charged particles resulting from ionization processes, comprising: a housing (16), a detection electrode (14) enclosed within the housing for collecting the charged particles, and an electrometer (12) having an input connected to the detection electrode for receiving a DC input signal therefrom and an output (18) for supplying a DC measurement signal as output. The housing comprises an electrostatic screen (16) for screening the detection electrode from external electric fields, whereby to reduce the sensitivity of the detection
(Continued)

electrode to such fields. The electrostatic screen includes an electrically conducting screening sheet (26) provided as a second electrode facing the detection electrode and formed with interstices to allow the entry of radiation into the housing, and the second electrode and the detection electrode are arranged to be maintained in use at a bias voltage with respect to one another so as to effect charge separation amongst charged particles resulting from ionization processes and thereby produce an ionic current impinging on the detection electrode.

19 Claims, 9 Drawing Sheets

(51) Int. Cl.
*H01J 49/00* (2006.01)
*G01T 1/185* (2006.01)
*H01J 49/26* (2006.01)

(58) Field of Classification Search
USPC .......... 250/370.01, 370.05, 370.06, 374, 380
See application file for complete search history.

(56) References Cited

U.S. PATENT DOCUMENTS

| | | | | |
|---|---|---|---|---|
| 4,705,948 | A * | 11/1987 | Ramsey | H01J 47/02 250/379 |
| 4,924,098 | A * | 5/1990 | Wasserman | G01T 1/185 250/374 |
| 4,972,081 | A * | 11/1990 | Dumbeck, Sr. | G01N 33/0024 250/253 |
| 6,489,615 | B2 * | 12/2002 | Bluzer | G01J 5/24 250/338.1 |
| 6,515,285 | B1 * | 2/2003 | Marshall | G01J 5/20 250/339.03 |
| 7,932,828 | B2 * | 4/2011 | Britton, Jr. | G06Q 10/08 250/370.01 |
| 8,115,179 | B2 * | 2/2012 | Riedel | H03F 3/08 250/390.01 |
| 9,081,102 | B2 * | 7/2015 | Carroll | G01T 1/17 |
| 2012/0049054 | A1 * | 3/2012 | Zhou | B82Y 15/00 250/265 |
| 2012/0146798 | A1 * | 6/2012 | Dziekan | G01T 1/185 340/600 |
| 2015/0279642 | A1 * | 10/2015 | Prance | G01T 1/185 250/282 |

FOREIGN PATENT DOCUMENTS

| | | |
|---|---|---|
| GB | 2249427 A | 5/1992 |
| GB | 2337155 A | 11/1999 |
| JP | 2178800 A | 7/1990 |
| WO | 03/048789 A2 | 6/2003 |
| WO | 2007107689 A1 | 9/2007 |

OTHER PUBLICATIONS

Search Report for GB1219488.2, mailed Feb. 22, 2013.
International Search Report and Written Opinion for PCT/GB2013/052823, mailed Mar. 10, 2014.

* cited by examiner

Apparatus for Sensing Ionic Current

APPARATUS FOR SENSING IONIC CURRENT

CROSS REFERENCE TO RELATED APPLICATIONS

The present application is a national phase entry under 35 U.S.C. §371 of International Application No. PCT/GB2013/052823, filed Oct. 30, 2013, entitled "APPARATUS FOR SENSING IONIC CURRENT," which designated, among the various States, the United States of America, and which claims priority to GB Patent Application No. 1219488.2, filed Oct. 30, 2012. All of the foregoing are hereby incorporated by reference.

This invention concerns apparatus for sensing and measuring ionic current generated by charged particles.

Ionisation processes produce charged particles or ions, and the invention in its preferred embodiments detects and measures ionic current resulting from such ionisation processes.

The expression 'ionic current' as employed herein may be taken to mean current consisting of ions generated by an ionisation process. The ionic current may exist in a gas, a vacuum, a liquid or a solid material, as will be described.

Further, as employed herein, the expression 'radiation' may be taken to include both charged particulate radiation, as in the case of fast electrons and heavy charged particles, and uncharged radiation, as in the case of electromagnetic radiation or neutrons.

THE PRIOR ART

Various forms of device for detecting a current produced by a source of ionising radiation are already known.

Conventional ionisation chamber radiation detectors operate by charged particles, or radiation, passing through a gas inside the chamber creating ionisation of the gas molecules. Ion pairs are formed within the gas during this ionisation process, and the application of an electric field serves to separate all of the charged ion pairs for collection. Current pulses in a conductor are generated proportional to the electric field, up to a saturation level where these devices are usually operated, and are counted to provide an output. Such detectors generally employ a large electric field ($\sim 10^5$ V/m), and require sealed gas filled (e.g. argon) tubes having windows, through which the radiation passes. The window materials usually consist of thin metal foil or mica sheet.

More especially, such an ionisation chamber may have a cylindrical structure, with a collecting electrode in the form of a central wire and an outer electrode in the form of a cylindrical housing. A large radial electric field, typically 100-300 V, between the central electrode and the outer electrode creates a process of charge separation, whereby ionisation products may be collected by the wire electrode. A current pulse, derived from the ionisation processes within the chamber, is fed through a high value resistor to create a voltage pulse. The voltage pulses are AC coupled through a capacitor to a high bandwidth amplifier intended to amplify the pulses for the purposes of pulse counting.

A known ionisation smoke detector includes a small $^{241}$Am source (<1 µCu) generating charged particles for collection by an electrode to provide an input current to an FET device biased with a combination of a resistor and the source of the FET. A metal housing surrounds the $^{241}$Am source, the electrode and the FET, and is usually biased at a fixed DC potential, so providing an electric field. The housing has a hole, through which smoke enters and causes the particle flow generated by the $^{241}$Am source to decrease, by collisions, so changing the potential on the input of the FET device and hence the output voltage. The output is supplied to a comparator where it is compared with a reference voltage, and triggers an alarm when a particular limit is passed. Commercial smoke detectors use integrated circuit devices and operate in a pulse mode to conserve battery life.

The above detector detects the presence or absence of smoke and is designed simply to trip when the quantity of smoke exceeds a particular level. The detection is not continuous, and no quantitative measurement of charge or current takes place, which significantly limits the application of this known device.

Published international patent application no WO03/048789 concerns an electric potential sensor that is capacitively coupled to a source to be detected and that functions through an AC displacement current. Such a sensor can measure electric field, spatial potential and, under specific conditions, static charge.

This known electric potential sensor has no capacity, however, either to detect charged particles and the products of ionisation processes, or to measure ionic current generated thereby.

THE INVENTION

The present invention seeks to provide a sensor for detecting and measuring ionic current generated by an ionisation process and for providing a measurement signal as output.

The present invention seeks to be able to discriminate between signals due to electric fields and those due to ionic current.

In a preferred embodiment, the present invention seeks to provide a charged particle sensor for detecting ionic current in a gas, a vacuum, a liquid or a solid and for measuring such ionic current.

In one example, the present invention seeks to provide a sensor wherein an ionisation process is produced in response to the presence of certain neutral particles and radiation, thereby creating charged particles, and wherein a resulting ionic current is detected and measured.

The present invention further seeks to provide an extremely cost effective advance on the prior art detectors mentioned above.

The present sensor is configured specifically to be insensitive to external electric fields, spatial potential and static charge, by the use of electrostatic screening. Instead, the sensor responds to charged particles collected by a detection electrode.

A feature of the present sensor is thus an arrangement for electrically screening the electrode from external electric fields, effectively reducing the sensitivity to electric fields, static charge and potential to as close to zero as possible. An electrostatic screen provided for this purpose may take the form of an electrically conducting housing structure including an electrically conducting mesh, or other sheet material with interstices or physical holes, which can allow the passage of radiation, and particles, charged or otherwise.

According to one aspect of the invention, there is provided a charged particle sensor for detecting and measuring ionic current generated by charged particles resulting from ionisation processes, comprising: a housing, a detection electrode enclosed within the housing for collecting the charged particles, and an electrometer having an input connected to the detection electrode for receiving a DC input signal therefrom and an output for supplying a DC measurement signal as output, the housing comprising an electrostatic screen for screening the detection electrode from external electric fields, whereby to reduce the sensitivity of the detection electrode to such fields, the electrostatic screen including a electrically conducting screening sheet provided as a second electrode facing the detection electrode and formed with interstices to allow the entry of radiation into the housing, wherein the second electrode and the detection electrode are arranged to be maintained in use at a bias voltage with respect to one another so as to effect charge separation amongst charged particles resulting from ionisation processes and thereby produce an ionic current impinging on the detection electrode.

According to another aspect of the invention, there is provided a charged particle sensor for detecting neutral radiation and particles, comprising: a detection electrode, an electrometer having an input connected to the electrode for receiving a detection input signal as input and an output for providing a DC measurement signal as output, and an electrostatic screen enclosing the detection electrode for screening the electrode from external electric fields, whereby to reduce the sensitivity of the detection electrode to such fields, the electrostatic screen comprising a screening sheet of conductive material provided with a plurality of holes for the passage of radiation and particles and arranged to act as a second electrode, the detection electrode having a planar surface formed with a coating, the coating being arranged to interact with the radiation and particles to generate charged particles by chemical or nuclear reaction.

According to another aspect of the invention, there is provided a method for sensing ionic current generated by charged particles, comprising: enclosing a detection electrode by means of an electrostatic screen for screening the detection electrode from external electric fields, whereby to reduce the sensitivity of the detection electrode to such fields, the electrostatic screen including an electrically conducting screening sheet provided as a second electrode facing the detection electrode and formed with interstices; passing radiation through the screening sheet, effecting charge separation between the second electrode and the detection electrode to produce an ionic current impinging on the detection electrode; and employing an electrometer connected to the detection electrode for receiving therefrom a DC input signal as input and for supplying a DC measurement signal as output.

According to another aspect of the invention, there is provided a method for detecting neutral particles and radiation, comprising: enclosing a detection electrode by means of an electrostatic screen for screening the detection electrode from external electric fields, whereby to reduce the sensitivity of the detection electrode to such fields, the electrostatic screen comprising a screening sheet of conductive material provided with a plurality of interstices and arranged to act as a second electrode; passing the particles or radiation through the screening sheet; interacting the particles or radiation with a coating on the detection electrode to generate charged particles by chemical or nuclear reaction; collecting the charged particles at the detection electrode; and employing an electrometer connected to the detection electrode for receiving a DC input signal from the detection electrode as input and for providing a DC measurement signal as output.

In one embodiment of this invention, charged particles from a sample source enter the detector by passing through the screen and impinging on the detection electrode, thereby forming a small DC current. This electron current is then arranged to produce a DC offset at the output of the detector that is proportional to the charge delivered at the input, despite there being no complete circuit loop involving a DC connection to the sample source. Additional selectivity may be added to the detector either by treating the screen as a grid or by adding an additional grid and connecting it to a fixed potential, either positive or negative. By this method the polarity and energy of the particles may be determined.

By comparison with the prior art ionisation chamber described above, the charged particle sensor according to embodiments of the invention has an inherently a higher capacitance structure, with a planar disc shaped guarded collecting electrode and a parallel disc shaped mesh electrode, both surrounded by a cylindrical shield.

The charged particle sensor according to the invention produces a DC average voltage signal derived from a combination of:

1. charged particles impinging directly on the collector electrode
2. 'daughter' ionisation products from processes within the housing or outside
3. the result of neutral particles or radiation interacting with a coated electrode.

This DC voltage is the result of the process of integration by the combination of the electrode capacitance and the effective input impedance of the electrometer.

The invention will be described further, by way of example, with reference to the accompanying drawings, in which.

Ionisation processes give rise to charged particles, which may be charge separated to generate an ionic current, as defined herein. Such ionic current can be measured according to the present invention by sensing apparatus incorporating a charged particle sensor. Various different forms of ionisation process, and correspondingly various different forms of sensing apparatus, are envisaged within the scope of the invention. In some cases, charged particles may be produced by a source of ionising radiation outside the sensing apparatus, and in some cases charged particles may be generated by ionisation processes within the sensing apparatus. However, all the embodiments include a charged particle sensor having certain common characteristic features, as discussed below, for detecting and measuring the ionic current produced by the ionisation process.

Figure 1:
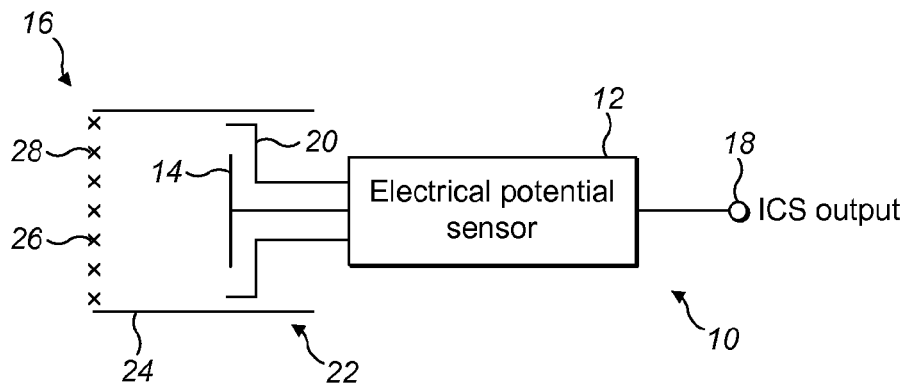
FIG. 1 is a schematic view of a charged particle sensor according to the present invention.
Figure 2:
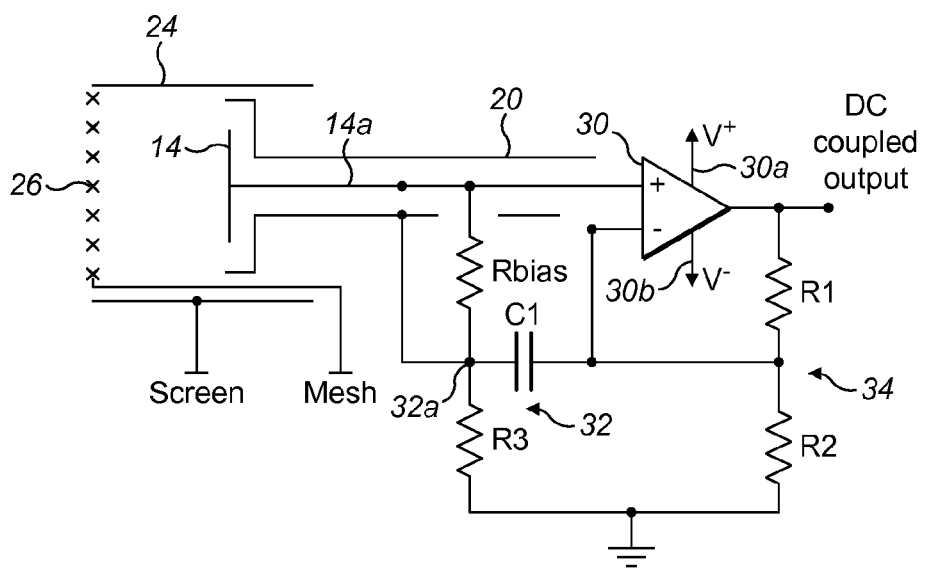
FIG. 2 is a circuit diagram of the charged particle sensor.
Figure 3:
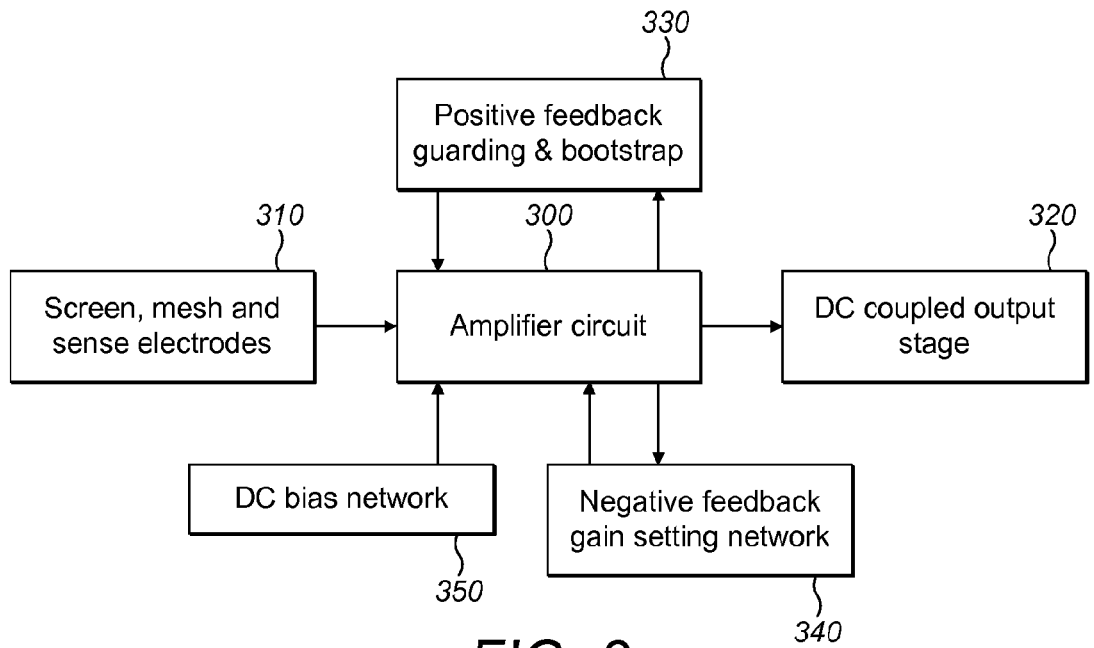
FIG. 3 is a block diagram of the overall charged particle sensor.

Referring initially to FIGS. 1 to 3, sensing apparatus having a charged particle sensor according to one embodiment of the present invention will be described.

As shown in FIG. 1, a charged particle sensor 10 according to the present invention comprises an electrometer 12 having a detection electrode 14, and an electric field screening arrangement 16 for the electrode 14. The electrode 14 comprises a conductive plate electrode electrically connected to the electrometer 12 and arranged as described below to provide a DC input to the electrometer 12, which then supplies a DC measurement signal at an output 18. The screening arrangement 16 serves a number of purposes, including providing electric field screening for the electrode 14, and providing a second electrode for producing in conjunction with the electrode 14 charge separation amongst ion pairs within the apparatus. The screening arrangement 16 may also be adapted to control the sensitivity of the electrode 14 to the charged particles within the sensing apparatus.

As shown, the detection electrode 14 is preferably a disc electrode, and is surrounded by a guard 20 maintained at the same potential as the electrode 14 by means of positive feedback from the electrometer 12. The guard 20 physically surrounds all of the electrode 14 and the input circuitry and wiring from the electrode 14 to the electrometer 12, and acts as a shield driven by the output of an amplifier in the electrometer 12, for example as shown in FIG. 2.

The screening arrangement 16 comprises an electrostatic screen 22, having a first electric field screen in the form of a cylindrical enclosure or housing 24 surrounding both the electrode 14 and the guard 20, and a second electric field screen in the form of a disc shaped mesh screen electrode 26 extending across an open face of the enclosure or housing 24 and arranged facing the plane surface of the disc electrode 14. Both the cylindrical enclosure 24 and the mesh screen electrode 26 are formed from electrically conducting material, thereby screening the electrode 14 from all external electric fields and effectively reducing the sensitivity of the electrode 14 to such electric fields, static charge and potential to as close to zero as possible. The mesh screen electrode 26 is formed with plural interstices or holes 28 allowing the passage of air, liquid, radiation, and charged particles into the housing 24 from outside through the mesh screen electrode 26, to enable the electrode 14 to collect particles impinging on the surface thereof.

The disc shaped mesh screen 26 is parallel to the disc shaped electrode 14, and effectively forms a second electrode. The mesh screen electrode 26 is maintained at a reference potential, as discussed below, with regard to the electrode 14, in order to aid charge separation amongst ion pairs within the housing 24 and control the sensitivity of the electrode 14 to charged particles impinging thereon. The electrode 14 then collects such charged particles, generating a standard electron current in a conductor for supply as input to the electrometer 12. Likewise, the housing 24 must be held at a reference potential, such as earth, and must not be floating, in order to ensure that it does not itself charge up during the detection process. Bias voltages between the mesh screen electrode 26 and the electrode 14 may typically be as low as a few volts, for example somewhere between + or −2.5 to 5 volts. A specific example envisages bias voltages between + or −4 volts. By contrast with the high voltages necessary in the prior art, these low voltages are sufficient to achieve the necessary charge separation, due to the use of a highly sensitive electrometer 12.

FIG. 2 is an electric circuit diagram of the charged particle sensor 10 of FIG. 1, showing details of the electrometer 12 and the electrical connections to the cylindrical enclosure 24 and mesh screen electrode 26. As shown in FIG. 2, the electrometer 12 comprises a standard non-inverting amplifier 30 to whose positive input the electrode 14 is connected by an input wire 14a. The output of the amplifier 30 is connected to the sensor output 18. As shown, the electrometer 12 is connected between supply rails $V^+$ and $V^-$, where V is typically between 2.5 to 5 volts, for example 4 volts. The electrometer 12 has a DC bias resistor Rbias for providing an input bias current for the amplifier 30, a bootstrapping arrangement 32, including a resistor R3 and a capacitor C1, for bootstrapping the bias resistor Rbias, and a gain setting arrangement 34, including resistors R1 and R2, for setting the gain of the amplifier 30.

An amplifier with gain is employed as the amplifier 30, because the small amplitude of the ionic current within the housing 24 would not otherwise be detected easily by the electrode 14 for collection thereby. The guard 20 is connected to a point 32a adjacent the capacitor C1 of the bootstrapping arrangement 32 and is thereby driven by the output of the amplifier 30 from a point where the gain is applied to the amplifier 30. By guarding the sensor electrode 14 by means of the guard 20, the effective input capacitance to the amplifier 30 may be minimised, while the bootstrapping arrangement for the bias resistor Rbias serves to increase the input resistance to the amplifier 30 to provide a high input impedance electrometer 12.

Both the cylindrical enclosure 24 and the mesh screen electrode 26 may be connected in a variety of configurations to sources of reference potential, as will be described below with reference to FIGS. 4 to 9.

Referring to FIG. 3, a schematic block diagram of the overall charged particle sensor 10 is seen to comprise an amplifier circuit 300 including the amplifier 30 as shown in FIG. 2, an electrode and electric field screening arrangement 310, including the sensor electrode 14, the mesh screen electrode 26 and the cylindrical enclosure 24, and a DC coupled output stage 320 including the output 18 for generating a DC measurement signal as output. Various ancillary feedback circuits are also included, for example a positive feedback arrangement 330 including the guard 20 and the bootstrapping circuit 32; a negative feedback arrangement 340 including the gain setting circuit 34; and a DC bias network 350 including the DC bias resistor Rbias to provide a stable DC bias current for the amplifier circuit 300. These ancillary circuits may include additional circuit components providing the indicated functionality, and additional impedance enhancing ancillary circuits may also be provided.

Figure 5:
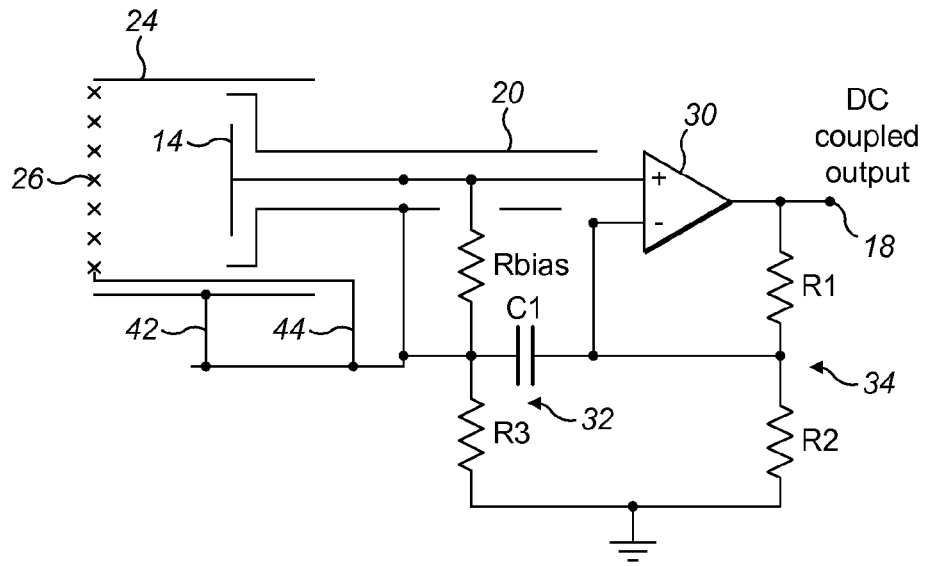

For example, the mesh screen electrode 26 and the housing 24 may have a bootstrap signal superimposed onto the DC charge separation signal, as shown in FIG. 5. This may be used to reduce the effective integration time for the sensor by partially neutralising the capacitance of the housing structure and the sensor.

More especially, the integration time for the sensor is:

$$\tau \sim R_{eff} \cdot C_{eff}$$

where $R_{eff}$ is the effective input resistance of the sensor and $C_{eff}$ is the total effective capacitance consisting of the sensor input capacitance, electrode capacitance and housing capacitance.

Bootstrapping the bias resistor Rbias increases the effective input resistance $R_{eff}$, and supplying the bootstrap signal to the housing reduces the total effective capacitance $C_{eff}$. If the bootstrap is only applied to the resistor Rbias, then the integration time becomes large and the response will be very slow. On the other hand, if the bootstrap is also applied to the housing, then $C_{eff}$ is reduced so compensating for the increase in $R_{eff}$. In this way, the integration time, which sets the bandwidth of the sensor may be controlled, as per FIG. 5.

FIG. 3 thus shows a sensor implementation including the screening 310 necessary to prevent influence by and distortion of results through detection of external electric fields, and the amplifier circuit 300 and the DC coupled output stage 320 enabling an ionic current to be collected by and detected through the electrode 14 for generating an electron current for supply to the input of the amplifier 30 to produce at the output of the amplifier 30 an output measurement signal. Sensitivity may be controlled by varying the voltage on the two electric field screens 24, 26, a higher bias voltage leading to a higher sensitivity. A combination of input impedance enhancing feedback techniques, as illustrated, in the circuits 330 and 340, and a circuit 350 to provide a stable DC bias current for the electrometer 12, are essential for the operation of the present sensor.

The two electric field screens 24, 26 may either be electrically connected to one another and to a reference potential, such as earth, or fixed at different potentials as desired. The cylindrical enclosure 24 may be either grounded, guarded like the electrode 14, or at a fixed DC potential of either polarity. Similarly the mesh screen 26 may either be grounded, guarded or held at a fixed positive or negative polarity. Manipulation of these potentials allows charged particles of particular polarity and energy to be either accepted or rejected. In addition, the sensitivity of the charged particle sensor 10 and the detection electrode 14 may be controlled by changing the spacing between the mesh screen electrode 26 and the detection electrode 14.

Examples of various screen configurations are shown in and will be described with reference to FIGS. 4 to 9, in which the same circuit features as those of the FIG. 2 embodiment are shown. Like parts are designated by the same reference numerals and will not be described further.

Figure 4:
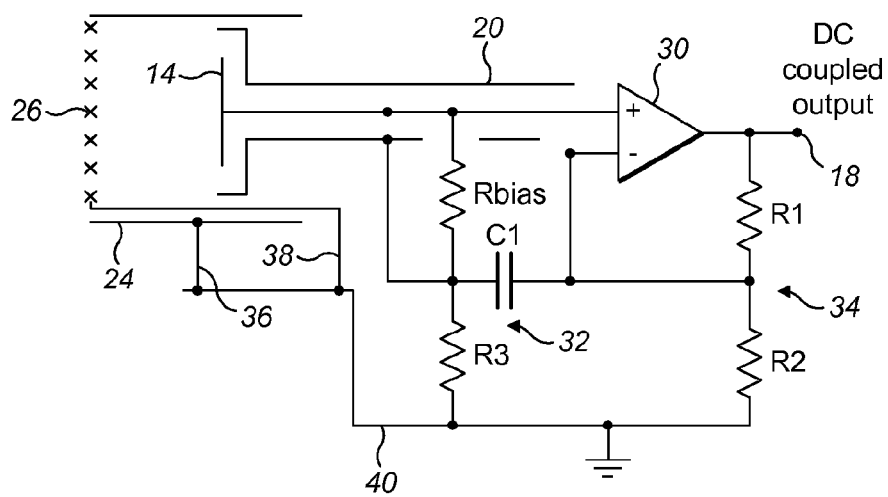
FIGS. 4 to 9 show circuit diagrams of variations on the charged particle sensor of FIG. 2.

A first option is shown in FIG. 4, in which the cylindrical enclosure 24 and mesh screen electrode 26 are both connected by means of respective connection lines 36, 38 to an earthed ground line 40. In this configuration, the charged particle sensor 10 will have equal sensitivity to both positively and negatively charged particles and will display a relatively low sensitivity. Such a configuration requires the charged particles being sensed to have a relatively high energy in order to reach the electrode 14.

If enhanced sensitivity is required, then the cylindrical enclosure 24 and mesh screen electrode 26 may be connected by means of respective connection lines 42, 44 to the guard 20, to be at the same potential as the guard 20, as shown in FIG. 5. This configuration enhances input impedance by reducing parasitic capacitance, and hence increases sensitivity to both positively and negatively charged particles.

Figure 6:
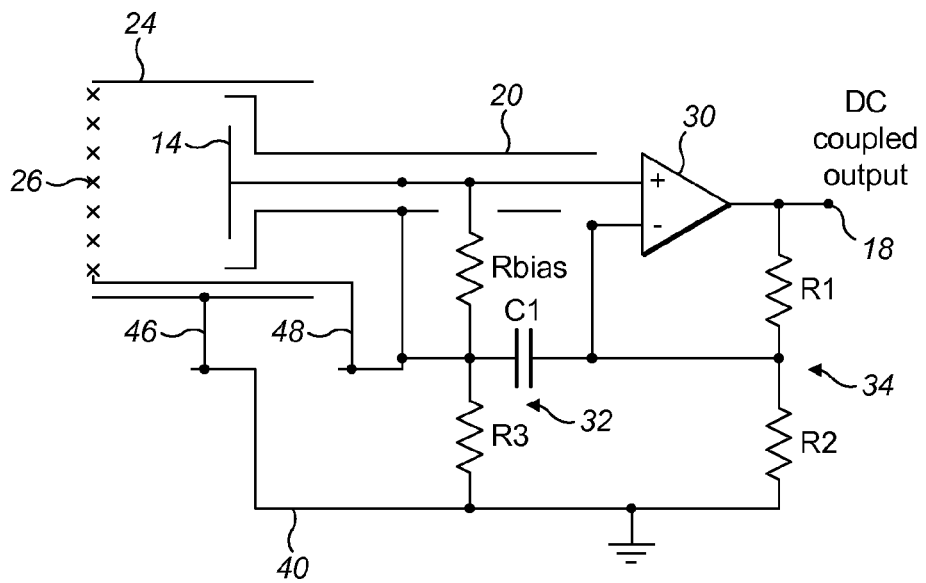

FIG. 6 shows an arrangement in which the cylindrical enclosure 24 is connected by means of a connection line 46 to the ground line 40, and the mesh screen electrode 26 is connected by a connection line 48 to the guard 20, thereby placing the cylindrical enclosure 24 at ground and the mesh screen electrode 26 at the same potential as the guard 20. Here, additional stray capacitance will be present from the grounded screen, leading to an intermediate level of sensitivity, which may be acceptable in some applications, for example in the detection of short range, low energy, positively charged alpha particles from an $^{241}$Am source or similar low activity radio-isotope.

Figure 7:
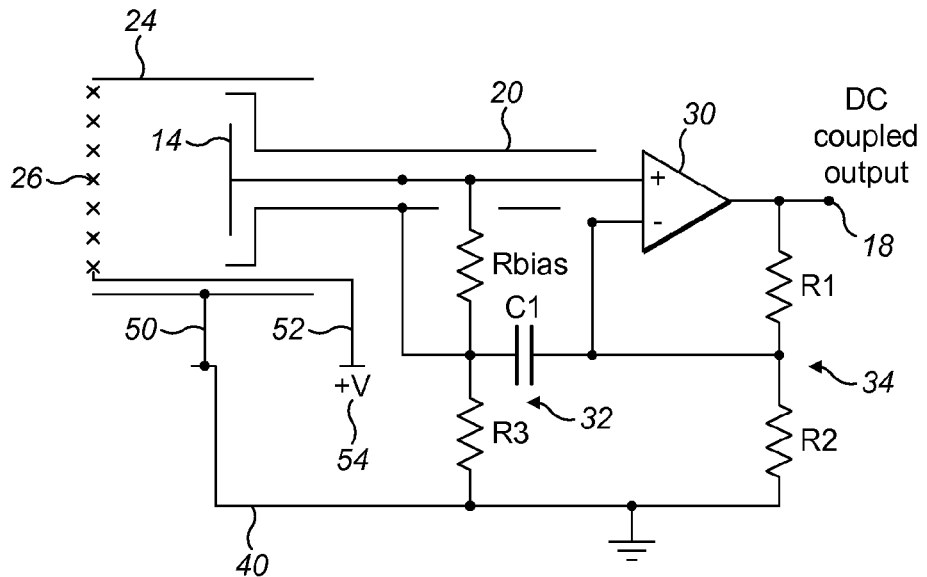
Figure 8:
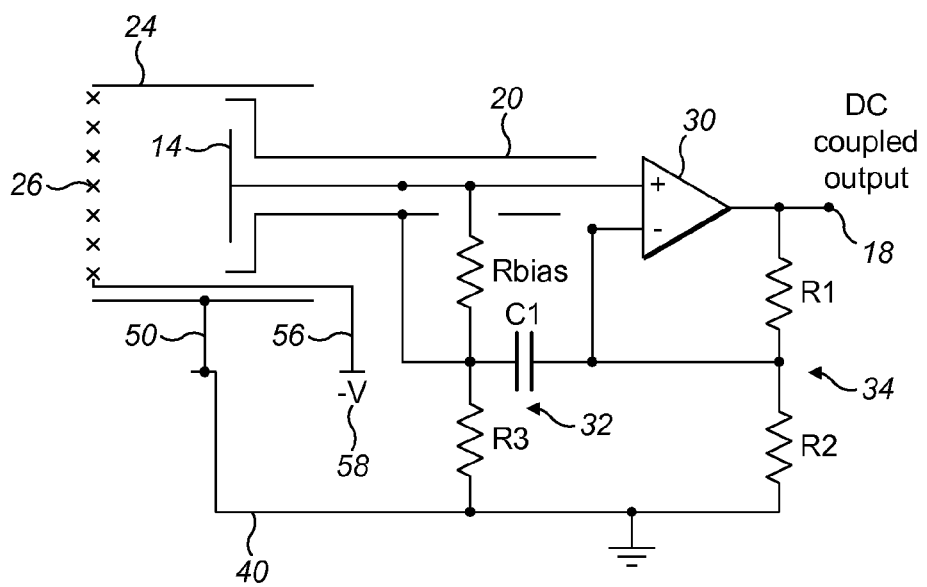
Figure 9:
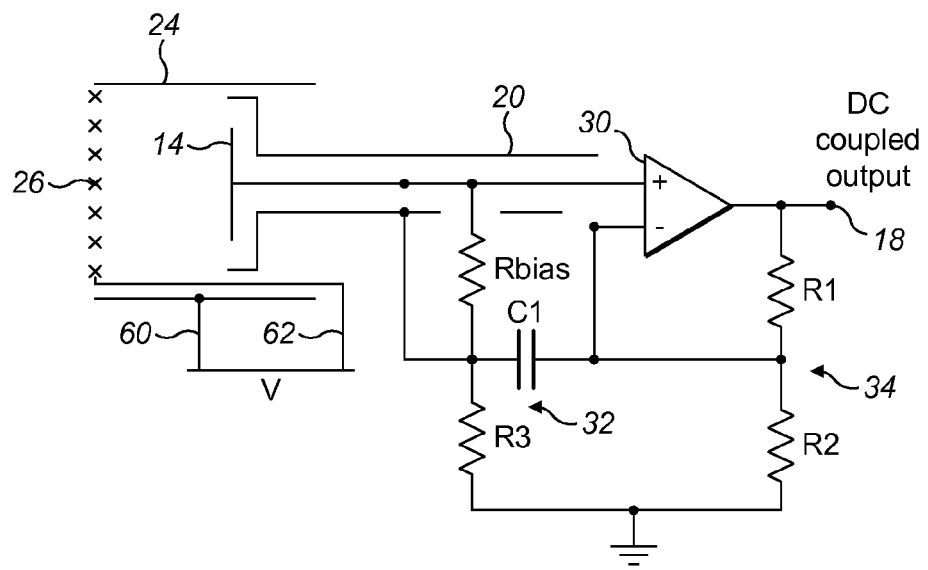

If discrimination of particle polarity is required, then DC bias voltages may be applied either to the mesh screen electrode 26, as shown in FIGS. 7 and 8, or to both the cylindrical enclosure 24 and the mesh screen electrode 26, as shown in FIG. 9 by connecting one or both of the two screens 24, 26 to a source of potential, positive or negative. A positive bias voltage will allow the preferential attraction of negatively charged particles by the mesh screen electrode 26, and hence the detection by the disc electrode 14 of positively charged particles, and a negative bias voltage will allow the preferential attraction of positively charged particles by the mesh screen electrode 26, and hence the detection by the disc electrode 14 of negatively charged particles.

More particularly, FIG. 7 shows an arrangement in which the cylindrical enclosure 24 is connected by way of a connection line 50 to the ground line 40 in order to earth or ground the enclosure 24, and the mesh screen electrode 26 is connected by way of a line 52 to a source 54 of positive potential (namely, the supply rail 30a in FIG. 2). The mesh screen electrode 26 is thereby biased at a positive DC voltage, and accordingly in use attracts negatively charged particles in preference to positively charged particles, so that the charged particles that pass through the mesh screen electrode 26 and impinge on the electrode 14 will be those that are positively charged.

In contrast, in the FIG. 8 embodiment, the cylindrical enclosure 24 is still connected by way of a connection line 50 to the ground line 40 and is thereby earthed or grounded, while the mesh screen electrode 26 is connected by way of a connection line 56 to a source 58 of negative potential (namely, the supply rail 30b in FIG. 2). In this example, the mesh screen electrode 26 is biased at a negative DC voltage and will attract and collect positively charged particles whilst allowing negatively charged particles to pass through and impinge on the detection electrode 14.

Turning to FIG. 9, it will be seen that both the cylindrical enclosure 24 and the mesh screen electrode 26 are connected by way of respective connection lines 60, 62 to a source of potential V, which may be either positive or negative as required (corresponding with one of the supply rails 30a, 30b, respectively in FIG. 2). This embodiment will provide the highest degree of discrimination between positively and negatively charged particles, since particles of opposite polarity to those being detected will be attracted to both of the cylindrical enclosure 24 and the mesh screen electrode 26. The two screens will thus allow very few of these particles of one polarity to pass and reach the detection electrode 14.

In each case, the charged particles, which pass through the mesh screen electrode 26, collect on the detection electrode 14 and thereby generate a potential that produces a DC input current to the amplifier 30, which is then reflected as a DC output signal at the output 18. The DC voltage at the electrode 14 is the result of a process of integration through the combination of the electrode capacitance and the effective input impedance of the electrometer. The DC voltage provides a signal which is proportional to the number of ionisation events occurring over a timescale set by the integration time $\tau \sim R_{eff} \cdot C_{eff}$, which time is determined by the total effective capacitance and input resistance of the sensor, as discussed above.

The presence of the finite DC discharge path provided by the DC bias network 350, including the resistor Rbias, prevents the sensor from reaching saturation. An equilibrium situation is reached between the charge and discharge processes resulting in a stable output voltage. For example, if the flow of charged particles is such that an input current Iin flowing into the detection electrode 14 is:

$$Iin = 1 \, fA \, (ie \, 10^{-15} A)$$

then, if we take the effective value of Rbias with feedback to be $10^{12} \Omega$, this will generate a signal at the input of the amplifier equal to:

$$Rbias \times Iin = 10^{12} \times 10^{-15} \, V$$
$$= 10^{-3} \, V$$
$$= 1 \, mV$$

Figure 10:
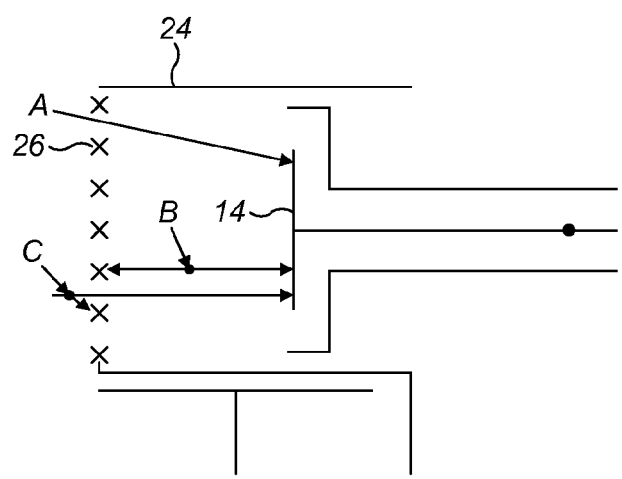
FIG. 10 is a diagram showing the ionisation processes that give rise to detection by an electrode of the charged particle sensor.

In practice, the process of detection by the charged particle sensor according to the basic embodiment of the invention may be somewhat more complex than indicated above, and the operation of such embodiment will now be described in general terms, with reference to FIG. 10. As shown, a source of charged particles A is situated outside the housing 24 in an environment of ambient air, and the particles A enter the housing 24 through the mesh screen electrode 26 and impinge directly on the detection electrode 14. Ionisation of the air within the housing 24 also takes place, giving rise to positive and negative charged particles B. These are separated by the electric field between the mesh screen electrode 26 and the collector detection electrode 14, and the particles B of one polarity also impinge on the detection electrode 14. In addition, some ionisation of the air outside the housing 24 takes place, giving rise to positive and negative charged particles C, some of which enter the housing 24 through the mesh screen electrode 26. These particles C also are separated by the electric field between the mesh screen electrode 26 and the collector electrode 14, but with lower efficiency than for the case of the particles B. Accordingly, the detector electrode 14 collects particles A, B and C of a particular polarity. A DC average voltage signal is then derived from:
 i. charged particles from the source impinging directly on the collector electrode, and
 ii. 'daughter' ionisation products from processes within the housing or outside.

The result is a composite signal output by the detector electrode, but that attributed to the charged particles themselves is very much smaller than that attributed to the 'daughter' ionisation products. By way of example, typically if we consider alpha particles from an americium alpha source, each alpha particle will typically ionise 10,000 air molecules.

The described detection system contains no complete circuit loops, as would conventionally be required in an electric circuit for current to flow. The ionic current sources radiate charged particles in free space and are not driven by a source of potential. They do not obey the conventional laws of electric circuits.

This may be illustrated by considering the following examples, including the detection of a naked candle flame as a source of ionised particles and the detection of ionising radiation from a source of α-particles.

Direct Detection of Ionised Gas

Figure 11:
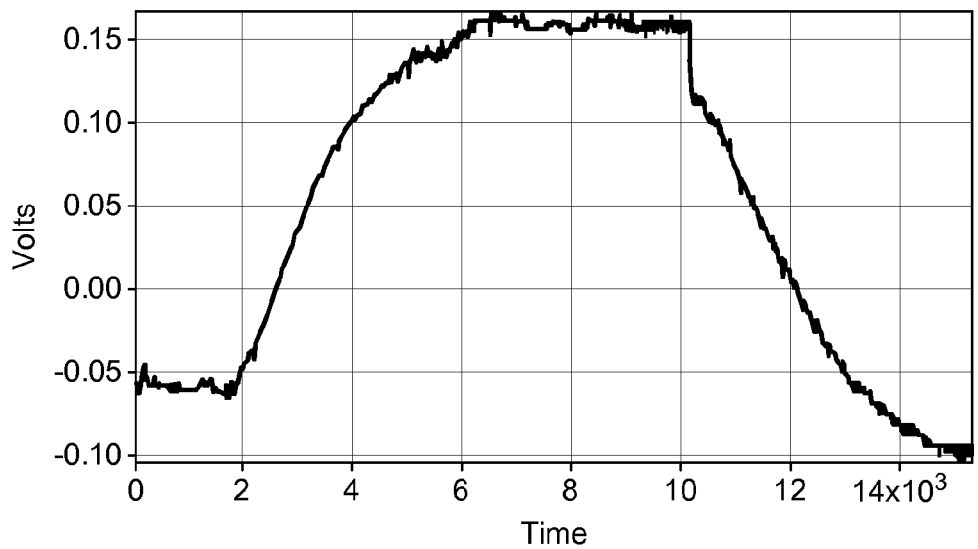
FIGS. 11 and 12 are graphs of measurement results obtained by employing the charged particle sensor of FIG. 2.

Various possible sources of ionised particles to be detected may include combustion products and plasmas. Even a relatively low temperature source, such as a naked candle flame, will produce sufficient ionisation products to be detectable. FIG. 11 is a graph showing measurements taken employing the charged particle sensor 10 of FIG. 4 at various time intervals following the introduction of a candle flame placed close to the mesh screen electrode 26 of the sensor 10. As shown in FIG. 11, an increase in DC offset occurs at the output 18 of the sensor 10 when the flame is placed close to the mesh screen electrode 26. The DC signal is seen to stabilise after a few seconds, due to the presence of the DC discharge path including the resistor Rbias in the sensor 10. When the flame is extinguished after 10 seconds, the DC signal is seen to decay rapidly within a few seconds.

Direct Detection of Ionising Radiation

Another example is described with reference to FIG. 12, which is a graph showing the detection of alpha radiation from a source of alpha particles at various time intervals.

Americium in the form of the $^{241}$Am isotope is an α-emitter commonly used in ionisation smoke detectors. It produces α-particles by radioactive decay irrespective of any external influences. A source of $^{241}$Am may be considered as a point source of ionic current, producing a stream of positively charged particles, which have a short range in air, generally of the order of a few cm's. If a source of $^{241}$Am is placed outside the housing 24 within this range of the charged particle sensor 10, the charged particles pass through the mesh screen electrode 26 and are incident on the detection electrode 14, causing the electrode 14 and hence the input of the amplifier 30 to charge to a finite potential. A DC signal is then generated at the output 18 of the amplifier 30 of the sensor 10.

Figure 12:
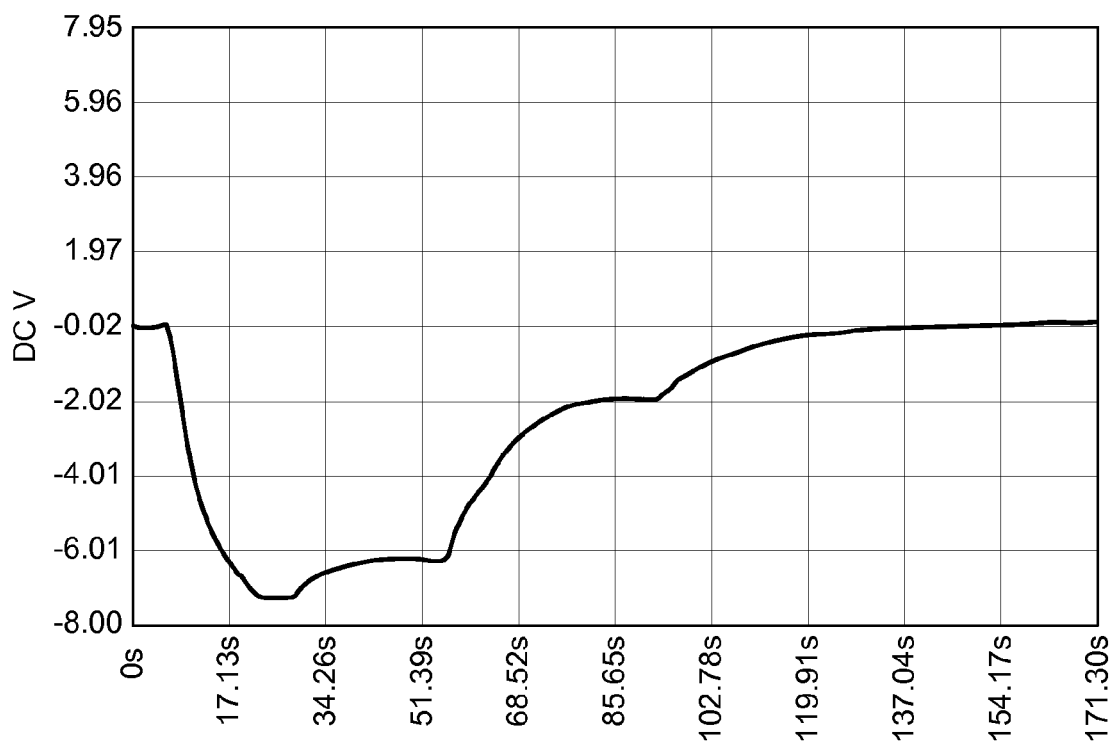

FIG. 12 shows the result of placing a $^{241}$Am source close to the mesh screen electrode 26, and then progressively moving the source and the sensor 10 relatively away from one another to three other different relative distances. On each occasion, the source is displaced and then left at a new position until the output of the sensor 10 settles to a steady DC level. This may be seen as the three plateaus in FIG. 12. In each case, as shown, the output voltage of the sensor 10 is seen to stabilise at a new, less negative, level.

Detection of Uncharged Particles and Electromagnetic Radiation

The invention may, with only relatively minor modification, be adapted to detect uncharged particles, such as neutrons, and electromagnetic radiation, such as gamma radiation, that is neutral. Both of these sources are uncharged but may be detected in an embodiment of the invention that is adapted, by the use of a converter, to initiate an ionisation process, and thereby produce charged particles and ionic current. In a particular embodiment of the invention, such converter may be achieved by the addition of a suitable target material to the sensor electrode 14, to generate charged particles through nuclear or chemical reaction. Advantageously, the target material is applied as a coating to the sensor electrode 14 for efficient charge transfer and current flow into the sensor.

Figure 13:
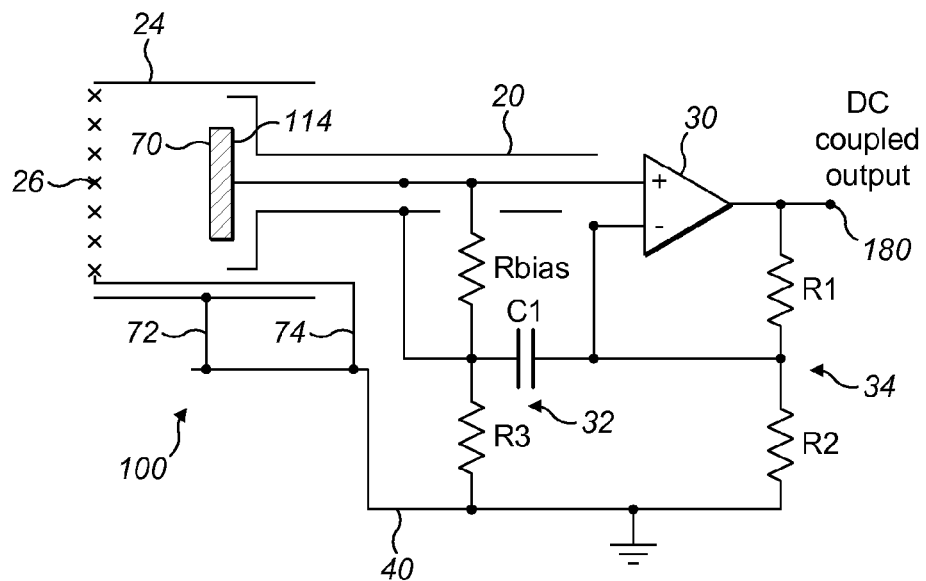
FIG. 13 is a circuit diagram for a variation on the sensor of FIG. 2 for detecting neutral particles and radiation by generating chemical or nuclear reactions producing charged particles and by detecting ionic current caused by such charged particles.

For example, neutron detection is possible in an embodiment of sensor 100 according to the invention, as shown in FIG. 13, in which the sensor electrode 114 is coated with a layer 70 of a converter material, such as boron. In the present embodiment, $^{10}$B isotope, or an enriched version of natural boron, is used.

The sensor 100 of FIG. 13 includes the same basic circuit elements as the sensor 10 of FIG. 2. Like parts are designated by the same reference numerals and will not be described further. The difference is that the sensor electrode 114 is coated with a boron layer 70. In this instance, both the cylindrical enclosure 24 and the mesh screen electrode 26 are connected by respective lines 72, 74 to the ground line 40, and accordingly are at ground potential. This will attenuate signals from any charged particles, whether positive or negative. Neutrons passing through the mesh screen electrode 26 impinge on the boron layer 70, where a nuclear reaction takes place between the neutrons and the boron to produce lithium and to release charged $\alpha$-particles. The $\alpha$-particles are collected by charging of the converter material 70 on the sensor electrode 114.

Figure 14:
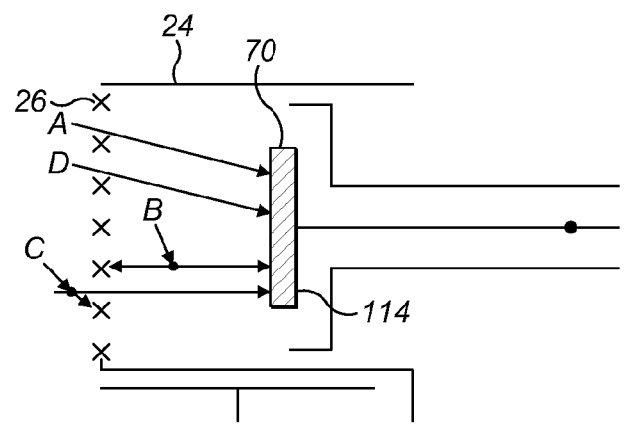
FIG. 14 is a diagram showing the ionisation processes that give rise to detection by a coated electrode of the charged particle sensor.

In this instance, the same processes as described with reference to FIG. 10 may also take place in the event that a source of charged particles is present in the vicinity of the charged particle sensor according to the invention, but in addition further processes will occur in relation to the neutral particles or radiation, as shown in and described with reference to FIG. 14.

As shown, a source of charged particles is situated outside the housing 24 in an environment of ambient air, and the particles A enter the housing 24 through the mesh screen electrode 26 and impinge directly on and charge the converter material 70 on the detection electrode 114. Ionisation of the air within the housing 24 also takes place, giving rise to positive and negative charged particles B. These are separated by the electric field between the mesh screen electrode 26 and the collector detection electrode 114, and the particles B of one polarity also lead to charging of the converter material 70 on the detection electrode 114. In addition, some ionisation of the air outside the housing 24 takes place, giving rise to positive and negative charged particles C, some of which enter the housing 24 through the mesh screen electrode 26. These particles C also are separated by the electric field between the mesh screen electrode 26 and the collector electrode 114, leading to charging of the converter material 70, but with lower efficiency than for the case of the particles B. The particles impinging on the detection electrode 114 will depend on the source of ionising radiation and the potentials present on the mesh screen electrode 26 and housing 24. Basically, particles of the same sign (charge polarity) as the potential will be preferentially detected, since those of opposite sign will be attracted towards the mesh screen electrode 26 and housing 24. As far as the detection electrode 114 and converter material are concerned, the converter 70 may be considered as a dielectric region attached to the detection electrode 114, so forming a single capacitor plate. Any net charge on the dielectric will be picked up by the detection electrode 114 and give rise to the input current (signal).

Additionally, neutral particle or radiation D interacts with the converter material 70 to produce charged particles. The conversion of the neutral particles occurs within the converter material 70 and the charged products are not likely to escape the surface of this material. These charged products also are separated by the electric field between the mesh screen electrode 26 and the collector electrode 114, leading to a net signal on the collector electrode 114.

Accordingly, a DC average voltage signal may be derived from any of:
  a. charged particles impinging directly on the collector electrode,
  b. 'daughter' ionisation products from processes within the housing or outside, and
  c. the result of neutral particles or radiation interacting with a coated electrode.

Direct detection of charged particles, e.g. $\alpha$ and $\beta$ particles, is thus possible as well as neutral particles and radiation with the use of converter materials.

In the event that other charged particles may also be present, as indicated above, that are not the result of ionisation processes generated by the coating material, it may become necessary to distinguish the signal generated as a result of the nuclear reaction taking place due to the neutrons impinging on the boron layer 70 from a signal due to the impingement of the other charged particles directly on the sensor electrode 114.

Two methods may be used to distinguish the neutron signal from that due to other charged particles.

Figure 15:
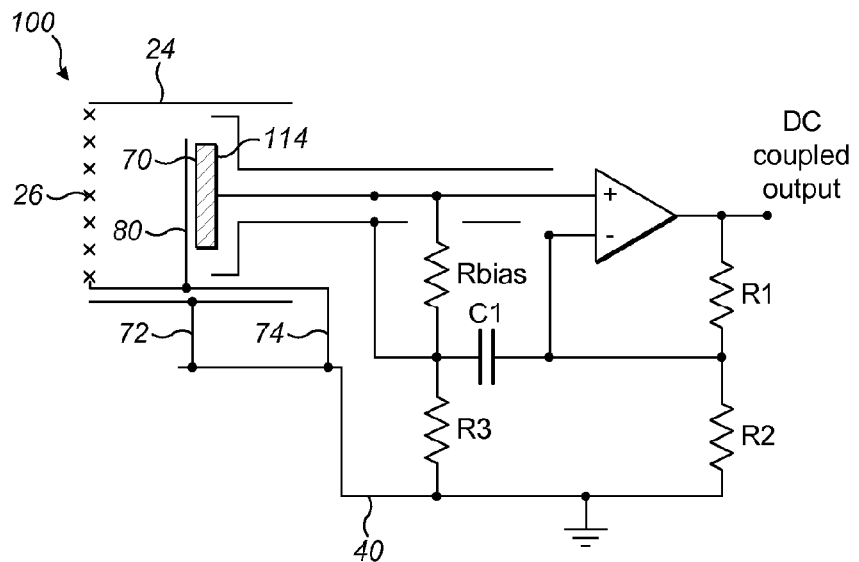
FIGS. 15 and 16 are circuit diagrams for variations on the sensor of FIG. 2 for detecting neutral particles and radiation by generating chemical or nuclear reactions producing charged particles and by detecting ionic current caused by such charged particles.

Firstly, the sensor arrangement of FIG. 13 may be adapted by placing a grounded metal foil electrode 80 immediately in front of the boron layer 70 of the coated sensor electrode 114, in order to collect any charged particles which would otherwise be incident on the sensor electrode 114, as shown in FIG. 15. Since the electrode 80 is made of foil and not mesh, charged particles will not pass through. By contrast, neutrons tend to pass through most thin metal materials, since typically neutrons can penetrate ~cm of solid materials, whereas charged particles are easily stopped using a metal foil. The foil electrode 80 can typically be a pure aluminium foil. The total macroscopic cross section of a material has units of inverse length, and gives the probability of interaction for a specific particle and a specific target material. The probability of detecting a particle falls off exponentially with target material thickness, and thus the thickness of the foil electrode 80 may be varied to allow discrimination between low and high energy neutrons, with only the higher energy particles being able to penetrate the thicker foils. Accordingly, the detection electrode collects only the ionisation products generated from the neutral radiation/particles.

Figure 16:
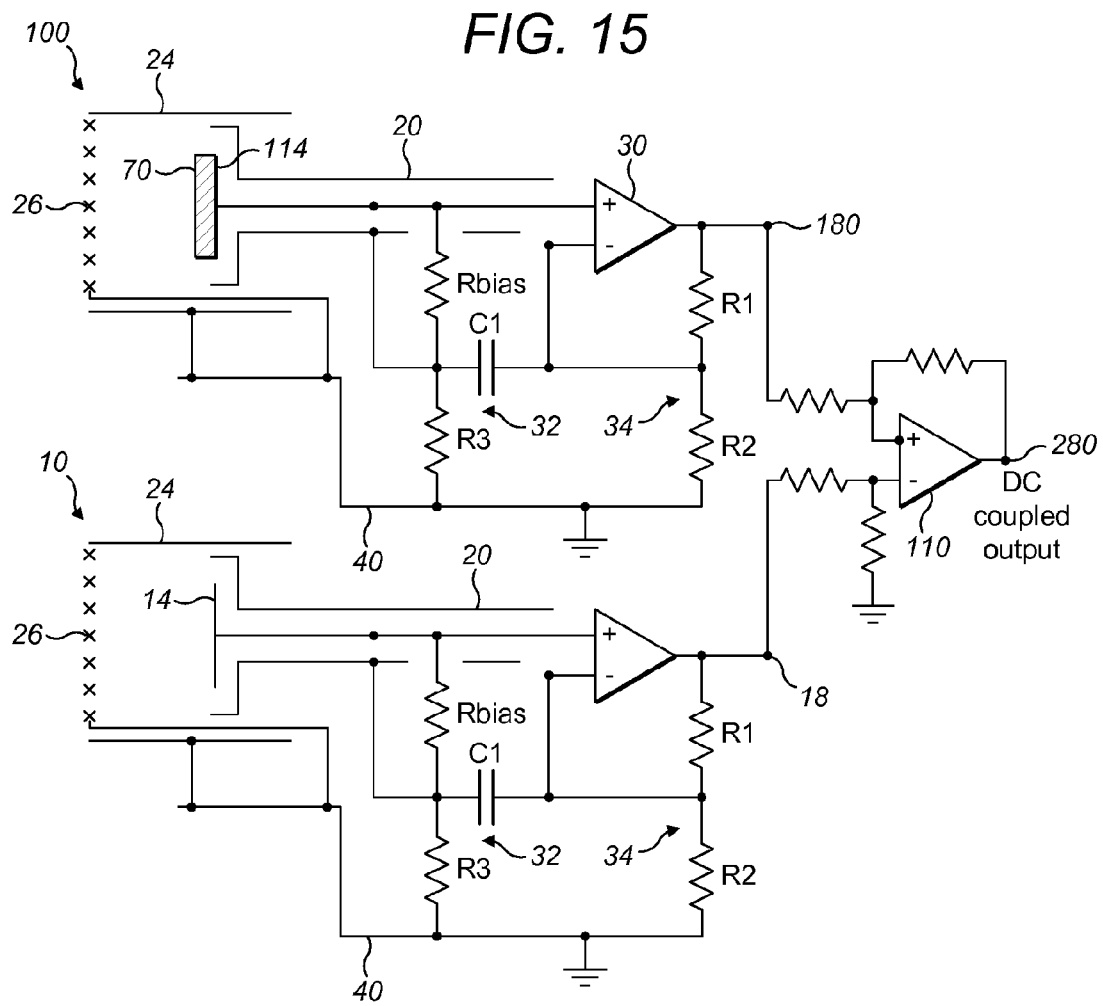

Secondly, the sensor arrangement 100 of FIG. 13 may be adapted by the addition of a second sensor 10 alongside the neutron detector 100, as shown in FIG. 16, wherein like parts are designated by the same reference numerals and will not be described further. In this instance, the two signals obtained respectively from the outputs 180, 18 of the sensors 100, 10 will be subtracted by means of a differential amplifier 110 to obtain an overall output at an output 280. Preferably, the two resistors in each corresponding pair of like resistors in both sensors 10, 100 are of equal resistance, in order to provide proper differential subtraction. Since the neutron detector 100 will detect both the charged particles and those due to the neutron interactions with the boron layer 70, whereas the sensor 10 will detect only the charged particles, it follows that the subtracted output will contain only the signal due to neutron interactions.

A variant of the sensor 100 of FIGS. 13 to 16 may also be employed to detect gamma radiation. In the case of gamma radiation, such radiation will not interact either with the metal of the disc electrode 14 of the sensor 10 or with the boron coating 70 of the neutron detector 100 to any significant degree. However, an alternative converter or target material may be chosen as an electrode coating, in place of the boron layer 70, to produce a secondary emission of charged particles due to nuclear reaction when irradiated with gamma rays of sufficient energy. For example, if a target material of high atomic number, such as tungsten or niobium, is chosen, then the cross section of the material for interaction with gamma rays, ie the probability of interaction between the gamma rays and the target material, is increased significantly. In short, the higher the atomic number the higher the sensitivity. In principle, any material could be used, but a material of lower atomic number would be much less effective, or, alternatively, a much thicker block of converter material would be required. Gamma rays impinging on such a coating will create a nuclear reaction resulting in secondary electrons being produced, which may then be detected by the sensor electrode 114 as already described. Once again, arrangements similar to those shown in FIG. 15 or FIG. 16 may be employed to discriminate between charged particles and gamma rays.

It will be appreciated that boron and tungsten are not the only materials that can be employed as converter materials. Other similar materials, which produce charged particles, may also be employed, according to the nature of the particles or radiation being detected.

Figure 17:
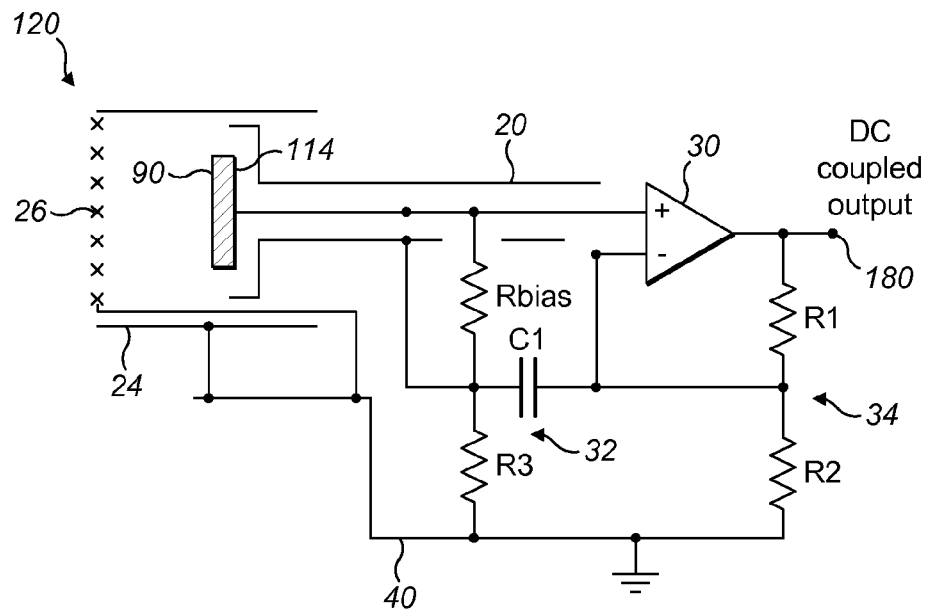
FIG. 17 is a circuit diagram for a further variation on the sensor of FIG. 2 employed as an optical sensor.

Furthermore, another embodiment of the invention may employ a chemical reaction, rather than a nuclear reaction, to produce charged particles on interaction with neutral radiation and neutral particles, and thereby permit the detection also of such radiation and neutral particles. An example of a sensor according to this embodiment detects incident light, by employing a suitable coating on the sensor electrode 114, as shown in FIG. 17. Here, an optical sensor 120 is created by employing a layer 90 of tin oxide as a coating on the sensor electrode 114, with both the cylindrical enclosure 24 and the mesh screen electrode 26 being grounded to minimise sensitivity to charged particles. Again, like parts are designated by the same reference numerals and will not be described further.

As before, this embodiment may also be employed with the modifications of FIG. 15 or FIG. 16. In the latter instance, the differential configuration uses a charged particle sensor 10, but without the optically sensitive coating 90. A differential system will provide an output with any residual charged particle signal subtracted, leaving only that due to optical interactions with the coating 90.

Figure 18:
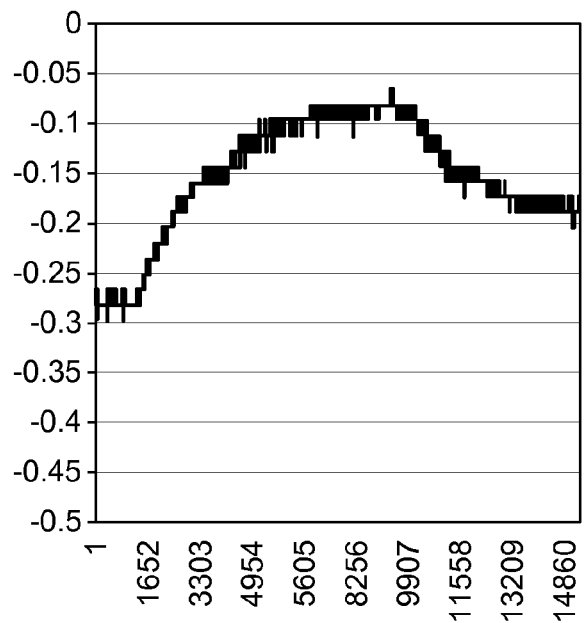
FIG. 18 is a graph of measurement results obtained by employing the charged particle sensor of FIG. 17.

In a test, the response of tin oxide to incident light was observed using the sensor 120 shown in FIG. 17, and the results were plotted in the graph of FIG. 18. Here, a cold light source, consisting of a white light emitting diode (LED), was turned on at data point 1500. The output of the sensor is seen to rise and stabilise after a few seconds. The LED was turned off at data point 9900, after which the signal decays. As can be seen, a curve of similar overall shape to that of FIG. 11 was obtained.

The invention, as described, with its planar disc electrode and parallel disc shaped mesh electrode has an inherently higher capacitance structure than the prior art ionisation chambers, is able to discriminate between signals due to electric fields and those due to ionic current, and provides a charged particle sensor capable of detecting ionic current in a gas, a vacuum, a liquid or a solid and of measuring such ionic current.

As will be appreciated various modifications are possible within the scope of the invention.

For example, in the embodiment having an uncoated electrode for detecting charged particles, direct detection of a particles from a $^{241}$Am source external to the sensor has been found to be possible in a vacuum. In this instance, the secondary ionisation of air molecules is eliminated by evacuating a chamber containing both the $^{241}$Am source and the sensor. Likewise, direct detection of β particles in a vacuum is also be possible by creating a vacuum around a source of such particles and the sensor.

In the embodiment of the invention employing an electrode coated with a converter material, the detection of neutrons originating from a $^{241}$Am—Be (10 GBq) source has been found to be possible using a Carborane ($C_2H_{12}B_{10}$) coated electrode. The detection of neutrons originating from a $^{241}$Am—Be (18 GBq) source has also been found to be possible using a Lithium Fluoride ($^6$LiF) coated electrode. In practice, in these examples, either converter material would work with either source.

The invention claimed is:

1. A charged particle sensor for detecting and measuring ionic current generated by charged particles resulting from ionisation processes, comprising:
    a housing,
    a detection electrode enclosed within the housing for collecting the charged particles, and
    an electrometer having an input connected to the detection electrode for receiving a DC input signal therefrom and an output for supplying a DC measurement signal as output, wherein the electrometer comprises an amplifier circuit having a DC bias resistor for providing an input bias current to the amplifier circuit, and feedback circuits for increasing the input impedance to the amplifier circuit and enhancing the sensitivity thereof, the feedback circuits including a guard circuit providing a guard surrounding the detection electrode, and a bootstrapping arrangement for bootstrapping the bias resistor,
    the housing comprising an electrostatic screen for screening the detection electrode from external electric fields, whereby to reduce the sensitivity of the detection electrode to such fields,
    the electrostatic screen including an electrically conducting screening sheet provided as a second electrode facing the detection electrode and formed with interstices to allow the entry of radiation into the housing,
    wherein the second electrode and the detection electrode are arranged to be maintained in use at a bias voltage with respect to one another so as to effect charge separation amongst charged particles resulting from ionisation processes and thereby produce an ionic current impinging on the detection electrode.

2. A sensor according to claim 1, wherein the feedback circuits further comprise a gain setting circuit for setting the gain of the amplifier circuit.

3. A sensor according to claim 1, wherein the electrostatic screen comprises an electrically conducting enclosure surrounding the detection electrode and maintained at a reference potential.

4. A sensor according to claim 1, wherein the electrostatic screen comprises an electrically conducting enclosure surrounding the detection electrode and the guard, and wherein the second electrode extends across an open face of the electrically conducting enclosure and is disposed parallel to the detection electrode.

5. A sensor according to claim 1, wherein the second electrode comprises a mesh.

6. A sensor according to claim 4, wherein at least one of the conducting enclosure and the second electrode is connected to ground.

7. A sensor according to claim 4, wherein at least one of the conducting enclosure and the second electrode is connected to the guard.

8. A sensor according to claim 4, wherein at least one of the conducting enclosure and the second electrode is connected to a source of potential.

9. A sensor according to claim 1, wherein the detection electrode comprises a plate electrode having a conductive surface opposed to the second electrode for collecting charged particles impinging thereon.

10. A sensor according to claim 1, further comprising a converter provided within the housing for generating an ionisation process by reaction with neutral radiation entering the housing through the screening sheet, in order to produce charged particles for charge separation between the second electrode and the detection electrode and an ionic current for collection by the detection electrode.

11. A sensor according to claim 1, wherein the detection electrode comprises a plate electrode having a surface opposed to the second electrode, and wherein said surface is coated with a material which interacts by chemical or nuclear reaction with neutral radiation passing through the second electrode to generate charged particles for charge separation between the second electrode and the detection electrode and an ionic current for collection by the electrode.

12. A sensor according to claim 11, wherein the coating material comprises one of: boron, tungsten, and a light sensitive material.

13. A sensor according to claim 11, further comprising a metal foil shield placed as an additional electrode in front of the coated surface of the plate electrode.

14. A sensor system comprising a first charged particle sensor according to claim 1, and a further such charged particle sensor, said two charged particle sensors being connected in a differential configuration for supplying a differential output.

15. A charged particle sensor for detecting neutral radiation and particles, comprising:
a detection electrode,
an electrometer having an input connected to the electrode for receiving a detection input signal as input and an output for providing a DC measurement signal as output, wherein the electrometer comprises an amplifier circuit having a DC bias resistor for providing an input bias current to the amplifier circuit, and feedback circuits for increasing the input impedance to the amplifier circuit and enhancing the sensitivity thereof, the feedback circuits including a guard circuit providing a guard surrounding the detection electrode, and a bootstrapping arrangement for bootstrapping the bias resistor, and
an electrostatic screen enclosing the detection electrode for screening the electrode from external electric fields, whereby to reduce the sensitivity of the detection electrode to such fields,
the electrostatic screen comprising a screening sheet of conductive material provided with a plurality of holes for the passage of radiation and particles and arranged to act as a second electrode,
the detection electrode having a planar surface formed with a coating,
the coating being arranged to interact with the radiation and particles to generate charged particles by chemical or nuclear reaction.

16. A method for sensing ionic current generated by charged particles, comprising:
enclosing a detection electrode by means of an electrostatic screen for screening the detection electrode from external electric fields, whereby to reduce the sensitivity of the detection electrode to such fields, the electrostatic screen including an electrically conducting screening sheet provided as a second electrode facing the detection electrode and formed with interstices;
passing radiation through the screening sheet, effecting charge separation between the second electrode and the detection electrode to produce an ionic current impinging on the detection electrode; and
employing an electrometer connected to the detection electrode for receiving therefrom a DC input signal as input and for supplying a DC measurement signal as output.

17. A method for detecting neutral particles and radiation, comprising:
enclosing a detection electrode by means of an electrostatic screen for screening the detection electrode from external electric fields, whereby to reduce the sensitivity of the detection electrode to such fields, the electrostatic screen comprising a screening sheet of conductive material provided with a plurality of interstices and arranged to act as a second electrode;
passing the particles or radiation through the screening sheet; interacting the particles or radiation with a coating on the detection electrode to generate charged particles by chemical or nuclear reaction;
collecting the charged particles at the detection electrode; and
employing an electrometer connected to the detection electrode for receiving a DC input signal from the detection electrode as input and for providing a DC measurement signal as output.

18. A sensor system comprising:
a first charged particle sensor for detecting and measuring ionic current generated by charged particles resulting from ionisation processes, and
a second charged particle sensor, the first and second charged particle sensors being connected in a differential configuration for supplying a differential output,
wherein the first charged particle sensor comprises:
a housing,
a detection electrode enclosed within the housing for collecting the charged particles, and
an electrometer having an input connected to the detection electrode for receiving a DC input signal therefrom and an output for supplying a DC measurement signal as output,
the housing comprising an electrostatic screen for screening the detection electrode from external electric fields, whereby to reduce the sensitivity of the detection electrode to such fields,
the electrostatic screen including an electrically conducting screening sheet provided as a second electrode facing the detection electrode and formed with interstices to allow the entry of radiation into the housing,
wherein the second electrode and the detection electrode are arranged to be maintained in use at a bias voltage with respect to one another so as to effect charge separation amongst charged particles resulting from ionisation processes and thereby produce an ionic current impinging on the detection electrode.

19. A charged particle sensor for detecting and measuring ionic current generated by charged particles resulting from ionisation processes, comprising:
a housing,
a detection electrode enclosed within the housing for collecting the charged particles, and an electrometer having an input connected to the detection electrode for receiving a DC input signal therefrom and an output for supplying a DC measurement signal as output, the housing comprising an electrostatic screen for screening the detection electrode from external electric fields, whereby to reduce the sensitivity of the detection electrode to such fields, the electrostatic screen including an electrically conducting screening sheet provided as a second electrode facing the detection electrode and formed with interstices to allow the entry of radiation into the housing, wherein the second electrode and the detection electrode are arranged to be maintained in use at a bias voltage with respect to one another so as to effect charge separation amongst charged particles resulting from ionisation processes and thereby produce an ionic current impinging on the detection electrode, wherein the detection electrode comprises a plate electrode having a surface opposed to the second electrode, and wherein said surface is coated with a material which interacts by chemical or nuclear reaction with neutral radiation passing through the second electrode to generate charged particles for charge separation between the second electrode and the detection electrode and an ionic current for collection by the electrode, and wherein the sensor further comprises a metal foil shield placed as an additional electrode in front of the coated surface of the plate electrode.

\* \* \* \* \*